(12) United States Patent
Spencer et al.

(10) Patent No.: US 11,080,471 B2
(45) Date of Patent: Aug. 3, 2021

(54) RULES-BASED AUTOMATED CHART DESCRIPTION SYSTEM

(71) Applicant: TD Ameritrade IP Company, Inc., Omaha, NE (US)

(72) Inventors: Chesley Carl Spencer, Chicago, IL (US); Chad Michael Cocco, Chicago, IL (US)

(73) Assignee: TD Ameritrade IP Company, Inc., Omaha, NE (US)

( * ) Notice: Subject to any disclaimer, the term of this patent is extended or adjusted under 35 U.S.C. 154(b) by 34 days.

(21) Appl. No.: 16/361,066

(22) Filed: Mar. 21, 2019

(65) Prior Publication Data
US 2020/0302004 A1 Sep. 24, 2020

(51) Int. Cl.
*G06F 17/00* (2019.01)
*G06F 40/169* (2020.01)
*G06K 9/00* (2006.01)
*G06N 5/04* (2006.01)

(52) U.S. Cl.
CPC ....... *G06F 40/169* (2020.01); *G06K 9/00476* (2013.01); *G06N 5/046* (2013.01); *G06K 2209/01* (2013.01)

(58) Field of Classification Search
CPC ........ G06F 40/169; G06F 40/30; G06F 40/56; G06F 16/288; G06F 16/2282; G06F 40/177; G06F 40/18; G06F 16/639; G06F 16/435; G06K 9/00476; G06K 2209/01; G06K 9/00449; G06K 9/52; G06N 5/046

USPC ........................................................ 715/231
See application file for complete search history.

(56) References Cited

U.S. PATENT DOCUMENTS

| | | | |
|---|---|---|---|
| 10,452,441 B1 * | 10/2019 | Subramanian ... | G06Q 10/06313 |
| 10,609,109 B1 * | 3/2020 | Asman ................ | H04L 65/60 |
| 10,614,033 B1 * | 4/2020 | Rothschilds ......... | G06F 16/172 |
| 2004/0107319 A1 * | 6/2004 | D'Orto ............... | G06F 16/9574 |
| | | | 711/133 |
| 2006/0136535 A1 * | 6/2006 | Boon ................... | G06F 40/18 |
| | | | 708/200 |
| 2012/0054858 A1 * | 3/2012 | Andersen ............. | H04L 51/12 |
| | | | 726/22 |
| 2014/0362087 A1 * | 12/2014 | Irani ................... | G06T 17/05 |
| | | | 345/440 |
| 2018/0189248 A1 * | 7/2018 | Lahmann ............ | G06F 16/5846 |
| 2018/0267960 A1 * | 9/2018 | Rajendran ........... | G06F 40/30 |
| 2018/0336253 A1 * | 11/2018 | Sekharan ............. | G06F 16/248 |

(Continued)

*Primary Examiner* — Jason T Edwards
(74) *Attorney, Agent, or Firm* — Harness, Dickey & Pierce, P.L.C.

(57) ABSTRACT

A system includes a request processing module configured to receive a chart description request associated with an asset. The system also includes a rules store configured to store rules, a rules application module configured to determine a set of rules and a set of results by applying each rule in the set of rules to chart data associated with the asset, a rules selector module configured to select a subset of results from the set of results, a text generation module configured to generate a text description based on the subset of results, and an output module configured to transmit the text description. Each of the rules includes a relevancy score. The selection of the subset of results is based on the score of each rule associated with the set of results. The description describes a chart associated with the asset.

21 Claims, 7 Drawing Sheets

(56) References Cited

U.S. PATENT DOCUMENTS

2019/0361971 A1\* 11/2019 Zenger ................. G06F 16/288
2020/0005258 A1\* 1/2020 Miller .................. G06F 40/205

\* cited by examiner

RULES-BASED AUTOMATED CHART DESCRIPTION SYSTEM

FIELD

The present disclosure relates to computerized data systems and methods for processing time-series data and more particularly to computerized automation of human-readable text generation.

BACKGROUND

A chart is an extremely useful tool for displaying large amounts of information. For example, a single chart can show the closing price and trading volume of a stock over a 52-week period. However, it may be difficult for some people to identify important features of the information presented in such a chart.

Although educational materials exist to help users understand different charts, this places a significant burden on the viewer. The viewer must seek out the appropriate material for the chart and expand a significant amount of time reviewing the material in order to properly understand all the information provided in the chart. Even individuals who understand the intricacies of a specific chart may not be able to extract information from a visually displayed chart—for example, non-sighted users.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A chart description system includes a request processing module configured to receive a chart description request. The chart description request is associated with an asset. The chart description system also includes a rules store configured to store a plurality of rules. Each rule of the plurality of rules includes a relevancy score. The chart description system further includes a rules application module configured to (i) determine a set of rules from the plurality of rules stored in the rules store and (ii) determine a set of results by applying each rule in the set of rules to chart data associated with the chart description request and a rules selector module configured to select a subset of results from the set of results. The selection of the subset of results is based on the relevancy score of each rule associated with the set of results. The chart description system includes a text generation module configured to generate a text description based on the subset of results and an output module configured to transmit the text description. The text description describes a chart associated with the chart description request.

In other features, the chart description system includes a data cache configured to store a plurality of historical data sets and a data acquisition module. The data acquisition module is configured to receive an identifier associated with the chart description request from the request processing module, determine whether the data cache includes historical data associated with the identifier, and in response to determining that the data cache does not include the historical data associated with the identifier, (i) retrieve the historical data associated with the identifier from a data source and (ii) store the historical data associated with the identifier in the data cache. The request processing module is configured to instruct the rules application module to retrieve the historical data associated with the identifier from the data cache. The chart data associated with the chart description request includes the historical data associated with the identifier.

In further features, the chart description request includes an image of a chart. The chart description system includes an image analysis module configured to determine an image identifier by performing optical character recognition on the image and provide the image identifier to the request processing module. The request processing module is configured to determine whether historical data associated with the image identifier is available, in response to determining that the historical data associated with the image identifier is available, instruct the rules application module to retrieve the historical data associated with the image identifier from the data cache, and in response to determining that the historical data associated with the image identifier is not available, (i) instruct the image analysis module to extract the historical data associated with the image identifier from the image and (ii) instruct the rules application module to retrieve the historical data associated with the image identifier from the image analysis module.

In other features, the chart description system includes a rules administration module configured to add a new rule to the plurality of rules stored in the rules store and update a relevancy score of a first rule of the plurality of rules.

In further features, the rules administration module is configured to obtain a first set of historical data, generate a prediction associated with the first set of historical data based on (i) the new rule and (ii) a characteristic associated with the new rule, identify a trend in the first set of historical data, compare the prediction to the identified trend, and determine a relevancy score of the new rule based on the comparison.

In other features, the data acquisition module is configured to determine a set of frequently requested identifiers and, for each identifier of the set of frequently requested identifiers, (i) periodically retrieve updated historical data associated with the identifier from the data source and (ii) store the updated historical data in the data cache.

In yet other features, the chart description request includes raw data. The request processing module is configured to provide the raw data to the rules application module and the chart data associated with the chart description request is the raw data.

In other features, the chart description request includes priority information. The output module is configured to transmit the text description based on the priority information.

In yet other features, each rule of the plurality of rules includes a script. The text generation module is configured to generate the text description based on the script of each rule associated with each result in the subset of results.

In other features, the output module is configured to transmit the text description in JavaScript object notation (JSON) format.

A method includes receiving a chart description request. The chart description request is associated with an asset. The method further includes determining a set of rules from a plurality of rules stored in a rules store, determining a set of results by applying each rule in the set of rules to chart data associated with the chart description request, and selecting a subset of results from the set of results. Each rule of the plurality of rules includes a relevancy score and the selection of the subset of results is based on the relevancy score of each rule associated with the set of results. The method also includes generating a text description based on the subset of results. The text description describes a chart associated with the chart description request.

In other features, the method includes storing a plurality of historical data sets in a data cache, determining an identifier associated with the chart description request, determining whether the data cache includes historical data associated with the identifier, and, in response to determining that data cache does not include the historical data associated with the identifier, (i) retrieving the historical data associated with the identifier from a data source and (ii) storing the historical data associated with the identifier in the data cache. The method also includes retrieving the historical data associated with the identifier from the data cache. The chart data associated with the chart description request includes the historical data associated with the identifier.

In further features, the chart description request includes an image of a chart. The method includes determining an image identifier by performing optical character recognition on the image, determining whether historical data associated with the image identifier is available, retrieving, in response to determining that the historical data associated with the image identifier is available, the historical data associated with the image identifier from the data cache, and extracting, in response to determining that the historical data associated with the image identifier is not available, the historical data associated with the image identifier from the image.

In other features, the method includes adding a new rule to the plurality of rules stored in the rules store and updating a relevancy score of a first rule of the plurality of rules.

In further features, the method includes obtaining a first set of historical data, generating a prediction associated with the first set of historical data based on (i) the new rule and (ii) a characteristic associated with the new rule, and identifying a trend in the first set of historical data. The method also includes comparing the prediction to the identified trend and determining a relevancy score of the new rule based on the comparison.

In other features, the method includes determining a set of frequently requested identifiers, and for each identifier of the set of frequently requested identifiers, (i) periodically retrieving updated historical data associated with the identifier from the data source and (ii) storing the updated historical data in the data cache.

In yet other features, the chart description request includes raw data. The chart data associated with the chart description request is the raw data.

In other features, the chart description request includes priority information. Transmitting the text description includes transmitting the text description based on the priority information.

In yet other features, each rule of the plurality of rules includes a script. Generating the text description includes generating the text description based on the script of each rule associated with each result in the subset of results.

In other features, transmitting the text description includes transmitting the text description in JavaScript object notation (JSON) format.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1A:
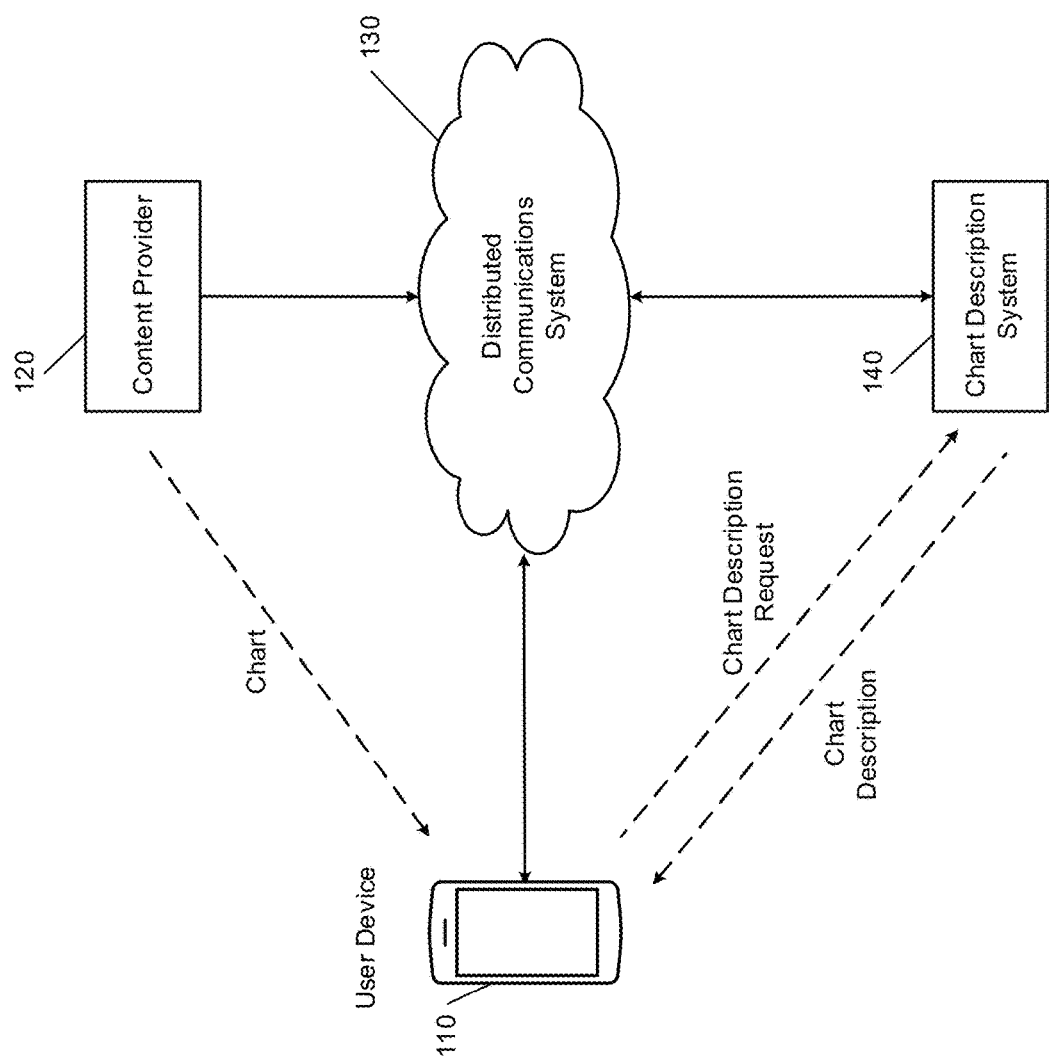
FIGS. 1A and 1B are functional block diagrams of example implementations of a chart description system according to the principles of the present disclosure.

In FIG. 1A, a user device 110 communicates with a content provider 120 via a distributed communications system 130, which may include the Internet. The user device may obtain a chart from the content provider 120. For example, the chart may plot prices and/or trading volume associated with a security over a period of time.

Figure 2:
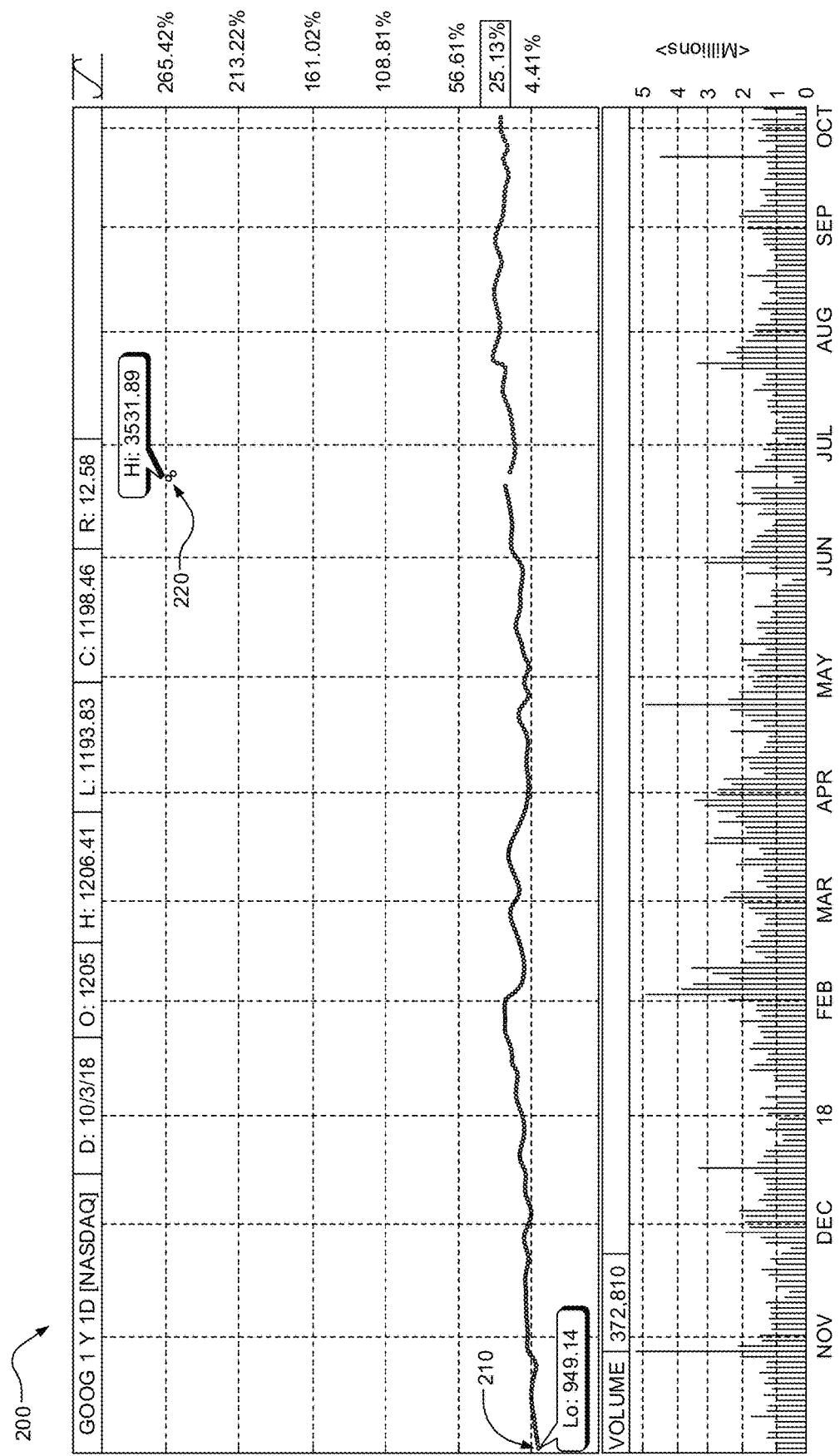
FIG. 2 is a graphical representation of an example chart provided by a content provider to a user device.

FIG. 2 shows an example chart 200 that may be provided by the content provider 120 to the user device 110. In FIG. 2, the chart 200 plots the change in closing price of Alphabet Inc. class A stock over a one-year period starting on Oct. 4, 2017 and ending on Oct. 3, 2018. Basic information such as general trends and general price and volume information may be gleaned visually from the information presented in the chart 200. For example, the 52-week low (indicated at 210) occurred on Oct. 4, 2017 and the 52-week high (indicated at 220) occurred in the second half of June 2018. However, it is hard, if not impossible, to extract more detailed information from the chart 200. Based only on the information in the chart 200, it is practically impossible to determine on exactly which day in June 2018 the 52-week high occurred. It is impossible to determine if the 52-week high is also an all-time high since that information requires knowledge of historical price information that is not shown in the chart 200.

To obtain information about a chart, the user device 110 may communicate with a chart description system 140 (FIG. 1A) via the distributed communications system 130. In response to receiving a chart description request from the user device 110, the chart description system 140 provides a concise text description of the chart associated with the request. As an example only, in response to receiving a request to describe the chart 200, the chart description system 140 may automatically generate a description that includes the text: "Current last price of GOOGLE on a 1-day time frame is 1175.97, which is 5 points above the 20-day moving average and 141 points above the 200-day moving average."

Figure 1B:
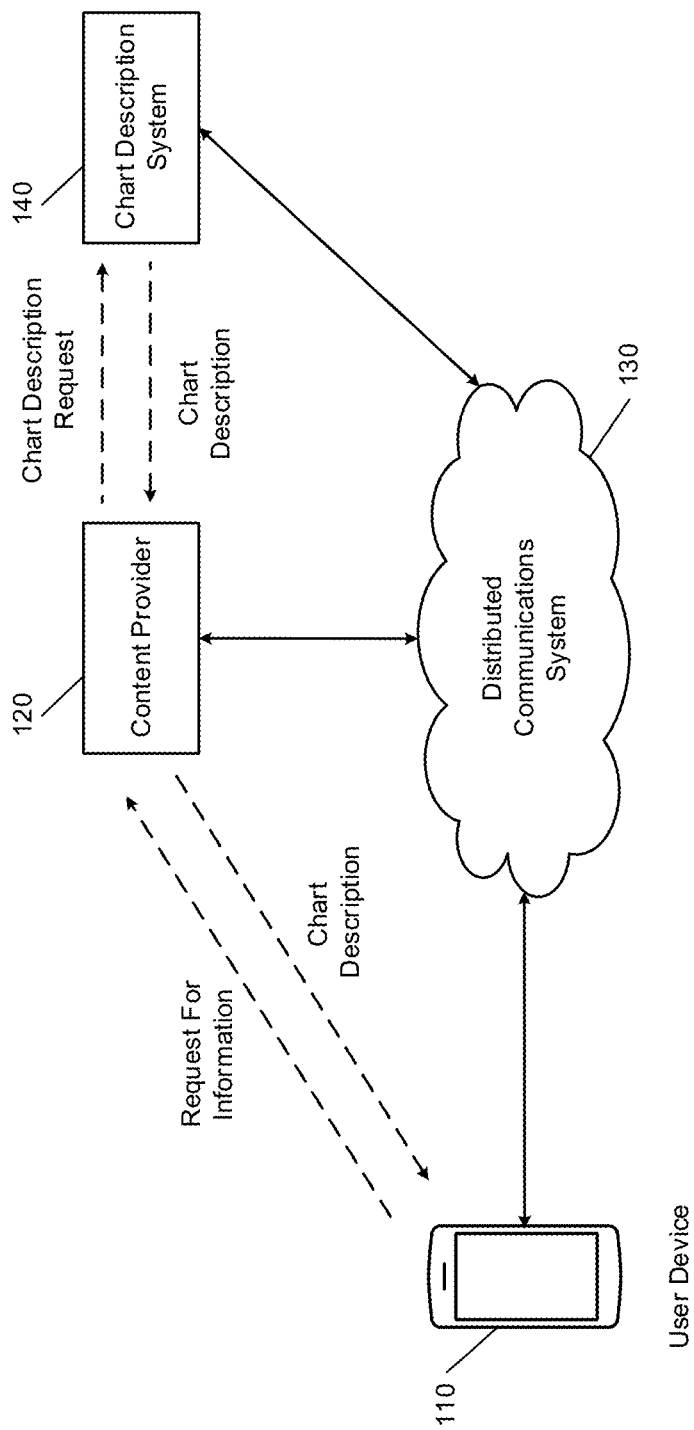

FIG. 1B is another example implementation of the chart description system 140. In FIG. 1B, the content provider 120 communicates with the chart description system 140 via the distributed communications system 130. The content provider may receive a request from the user device 110 for information—such as the price history for a security. The content provider 120 may generate a chart description request based on the information request from the user device 110. The chart description request may include the name of the security. The chart description system may generate a chart description that includes a brief text description of historical data associated with the security. In various implementations, the content provider 120 may send the text description received from the chart description system 140 to the user device 110.

In other implementations, the content provider 120 may transform the text description of the chart into an audio description. For example, the content provider may perform a text to speech process on the text description received from the chart description system 140 to generate the audio description. In such implementations, the content provider 120 may provide the audio description to the user device 110 in response to the request for information. The user device 110 in this case may be a smart speaker or other computerized personal assistant.

Figure 3:
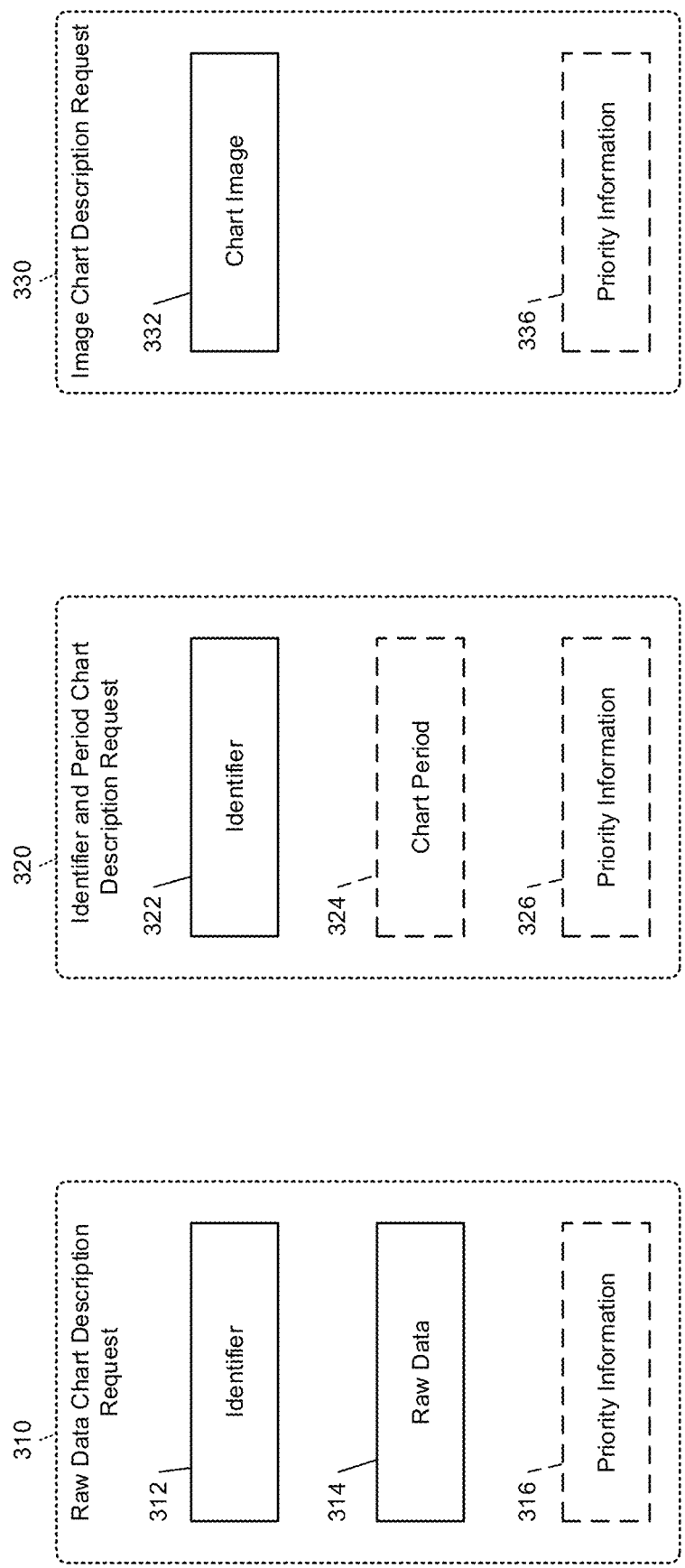
FIGS. 3A-3C are representations of example chart description requests according to the principles of the present disclosure.

FIG. 3A-3C are examples of chart description requests that may be processed by the chart description system 140. FIG. 3A is a raw data chart description request 310. The raw data chart description request 310 includes an identifier 312 and raw data 314. The identifier 312 is a name or symbol associated with the raw data 314. As an example only, the identifier 312 may be a name or stock symbol of a company and the raw data 314 may be historical price and volume data for the company.

The raw data chart description request 310 may also include priority information 316, which describes how and when the request should be fulfilled by the chart description system 140. The priority information 316 may include an email address and a specific time when the chart description should be sent to the included address. The priority information 316 may indicate that the chart description should be provided as soon as it is generated by the chart description system 140—in other words, in real time. By default, the chart description system provides the chart description in real time.

FIG. 3B is an identifier and period chart description request 320. The identifier and period chart description request 320 includes an identifier 322 that is a name or symbol of a security. As an example only, the identifier 322 may be a name or stock symbol of a company. The identifier and period chart description request 320 may also include a chart period 324. The chart period 324 is a length of time—for example, the past 52 weeks—that defines a period of a chart associated with the identifier 322.

FIG. 3C is an image chart description request 330. The image chart description request 330 includes a chart image 332. In some implementations, the chart image 332 may encode an image file of a chart, such as in scalable vector graphics (SVG) format. In other implementations, the chart image 332 may specify a location of the image file, such as with a uniform resource locator (URL).

The identifier and period chart description request 320 may include priority information 316 and the image chart description request 330 may include priority information 336. The priority information 326 and the priority information 336 describe how and when the respective request should be fulfilled and are similar to the priority information 316 of the raw data chart description request 310 described above.

Figure 4:
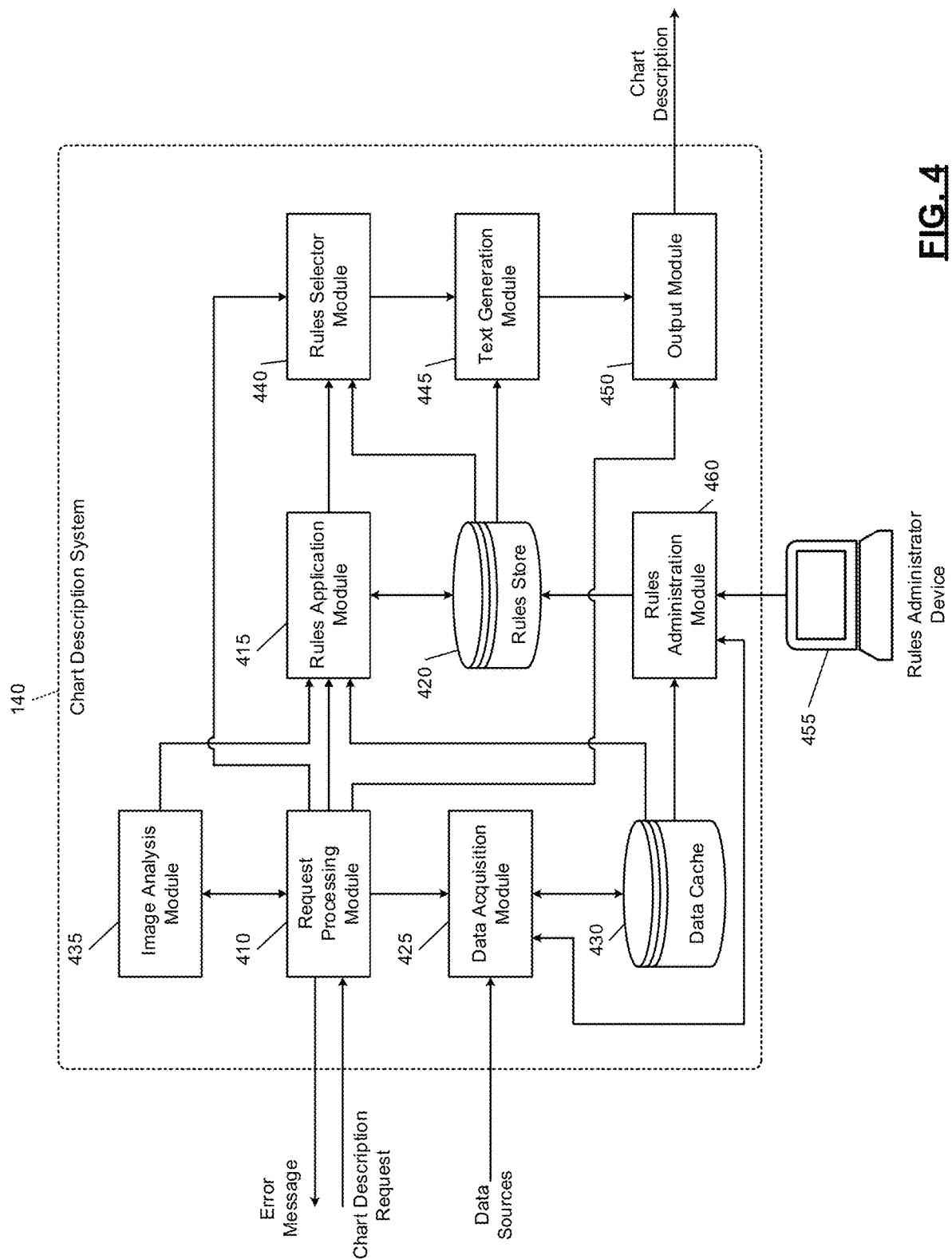
FIG. 4 is a functional block diagram of an example implementation of a chart description system of the present disclosure.

FIG. 4 is a functional block diagram of an example implementation of the chart description system 140. The chart description system 140 includes a request processing module 410 that receives a chart description request. A rules application module 415 determines the results of rules stored in a rules store 420. For example, in response to receiving a chart description request that includes an identifier and raw data for a chart—such as the raw data chart description request 310—the request processing module 410 sends the identifier and raw data included in the request as chart data to the rules application module 415 and instructs the rules application module 415 to apply rules stored in the rules store 420 to the chart data.

The request processing module 410, in response to receiving a chart description request that includes an identifier and a chart period—such as the identifier and period chart description request 320—queries a data acquisition module 425 to determine whether a data cache 430 includes historical data associated with the identifier and chart period included in the chart description request. Upon determining that the data cache 430 contains the historical data, the request processing module 410 provides the identifier and chart period to the rules application module 415 and instructs the rules application module 415 to retrieve the historical data associated with the provided identifier and chart period from the data cache 430. The rules application module 415 uses the retrieved data as chart data and applies the rules stored in the rules store 420 to the chart data.

The data acquisition module 425 obtains historical data—for example, pricing data and trading volume—from data sources and selectively stores the historical data locally in the data cache 430. For example, in response to receiving an identifier from the request processing module 410, the data acquisition module 425 determines whether the data cache 430 includes the data. If the data cache 430 does not include data associated with the provided identifier, the data acquisition module 425 attempts to retrieve the data from the data sources. In various implementations, the data sources may be owned and/or operated by the same entity that owns and/or operates the chart description system 140. In other implementations, the data sources may be owned and/or operated by a third party.

In response to successfully retrieving historical data associated with the provided identifier, the data acquisition module 425 stores the retrieved historical data in the data cache 430 and notifies the request processing module 410 that the historical data is available. Alternatively, if the data acquisition module 425 is not able to retrieve historical data associated with the provided identifier—for example, the data sources do not have pricing data associated with the identifier—the data acquisition module 425 notifies the request processing module 410 that the requested historical data is not available.

In some implementations, all retrieved historical data is cached until the data cache 430 runs out of storage space. Once the data cache 430 is full, the data acquisition module 425 determines which historical data to evict first from the data cache 430 in order to make room for newly retrieved historical data. In other implementations, the data acquisition module 425 may simply evict the oldest historical data from the data cache 430 in a first in, first out scheme.

The data acquisition module 425 may determine identifiers that are frequently provided by the request processing module 410. The data acquisition module 425 may pre-fetch historical data associated with frequently provided identifiers. The data acquisition module may perform these pre-fetches on a periodic basis so that the historical data is fresh. Further, the pre-fetched historical data may be precluded from eviction from the data cache 430. The data acquisition module 425 may automatically determine how frequently the historical data changes for these frequently requested identifiers and adjust the periodic retrieval rate accordingly.

In response to receiving a chart description request that includes an image of a chart—such as the image chart description request 330—the request processing module 410 provides the image included in the request to an image analysis module 435. The image analysis module 435 extracts an identifier associated with the chart as well as the axis labels of the chart from the image. For example, the image analysis module 435 may perform optical character recognition (OCR) to extract the information from the image. The image analysis module 435 provides the identifier and axis labels to the request processing module 410.

The request processing module 410 provides the extracted identifier to the data acquisition module 425. In response to determining that historical data is available for the extracted identifier, the request processing module 410 determines a period of time associated with the chart image based on the axis labels. For example, the horizontal axis may be assumed to indicate time, and the time period may be extracted from the leftmost and rightmost axis labels. The request processing module 410 then provides the extracted identifier and determined period to the rules application module 415. The request processing module 410 instructs the rules application module 415 to retrieve historical data for the provided identifier and period of time from the data cache 430 and to apply the rules stored in the rules store 420 to the retrieved data.

If historical data for the extracted identifier is not available from the data acquisition module 425, the request processing module 410 instructs the image analysis module 435 to extract the historical data from the image included in the chart description request. For example, the image analysis module 435 may perform vertical axis labels and plot image analysis to extract data from the image. The image analysis module 435 provides the extracted historical data to the rules application module 415. The request processing module 410 provides the extracted identifier and determined period to the rules application module 415 and instructs the rules application module 415 to apply the rules stored in the rules store 420 to the extracted historical data.

The rules application module 415 determines a set of the rules stored in the rules store 420 to apply to the chart data. Each rule stored in the rules store 420 is associated with a security type—such as futures products or stocks—and the rules are grouped in sets according to the associated security type. The rules application module 415 may determine the security type associated with the chart data based on the identifier provided by the request processing module 410. The rules application module 415 then applies the set of rules that corresponds to the determined security type to the chart data.

In various implementations, the application of a stored rule to the chart data results in either a true or false outcome. As an example only, the rules store 420 may include a 52-week low rule, a 52-week high rule, an all-time low rule, an all-time high rule, a moving average convergence divergence (MACD) crossing above rule, and a MACD crossing below rule. The result of the 52-week low rule or the 52-week high rule is true when the chart data includes a 52-week low price or a 52-week high price, respectively. The result of the all-time low rule or the all-time high rule is true when the chart data includes an all-time low price or an all-time high price, respectively.

The result of the MACD crossing above rule is true when a MACD line crosses above a signal line. The MACD line may be the value of a 12-period exponential moving average (EMA) of the historical data minus a 26-period EMA of the historical data. The signal line may be the 9-day EMA of the MACD line. Similarly, the MACD crossing below rule is true when the MACD line crosses below the signal line. The rules application module 415 sends the results of the applied set of rules to a rules selector module 440.

The rules selector module 440 determines a subset of the applied set of rules. The subset of rules is used by a text generation module 445 to generate a description of the chart associated with the chart description request. Each rule stored in the rules store 420 includes a relevancy score. In some implementations, the relevancy score of a rule is a static predetermined value. As an example only, a rule identifying a current price as an all-time high price may have a higher relevancy score than a rule identifying the current price as the high price of the day. From a pricing perspective, a security hitting an all-time high may generally be a more noteworthy event than the security hitting a daily high.

In other implementations, the relevancy score of a rule may be a dynamic value. For example, the relevancy score may be related to one or more values associated with the rule—such as a current last price and a moving average. In such an example, the relevancy score of the rule may increase as the difference between the last current price and the moving average increases.

The rules selector module 440 selects the rules with the highest relevancy scores among the rules that resulted in a true outcome. The request processing module 410 may specify a number of rules to be used to describe the chart based on the received chart description request. If the chart description request may specify a preferred number of rules. For example, the chart description request does not specify a preferred number of rules, the request processing module 410 specifies a preselected default number to the rules selector module 440. In various implementations, the default number of preferred rules is three.

The rules selector module 440 provides the selected subset of rules and associated results to the text generation module 445. The rules selector module 440 also provides the chart data to the text generation module 445. Each rule stored in the rules store 420 includes a text script associated with the rule. The text script may include variables associated with the rule. The text generation module 445 generates the text description by using the chart data to determine values for variables in the text scripts associated with the selected subset of rules. As an example, a 52-week high rule may include the text script: "The 52-week high for [name] was [52_high_price] and occurred on [52_high_date]." To generate a text description based on the 52-week high rule, the text generation module 445 would replace [name] with the identifier associated with the chart request, [52_high_price] with the 52-week high price associated with the chart data, and [52_high_date] with the date that the 52-week high price was reached. The text generation module 445 provides the generated text description to an output module 450.

The output module 450 outputs the generated text description of the chart. In response to the chart description request including priority information, the request processing module 410 provides the output module 450 with the included priority information. The output module 450 outputs the text description according to priority information. For example, the output module 450 may email the text description to an email address specified in the priority information. In addition, the output module 450 may output the text description at a specific time indicated in the priority information.

If the chart description request does not include priority information, the request processing module 410 instructs the output module 450 to immediately output the text description in a default format to the device that provided the chart description request to the request processing module 410. In various implementations, the default format is JSON (JavaScript Object Notation). In other implementations, the default may be another common format, such as plain text.

New rules may be added to the rules store 420 by a rules administration module 460. A rules administrator can provide new rules to the rule administration module 460 via the rules administrator device 455. The rules administration module 460 may set the relevancy score of the new rule to a value provided by the rules administrator. As described in more detail below, the rules administrator module 460 may determine the relevancy score of the new rule based on a provided characteristic and available historical data. The rules administrator module 460 may also update rules currently stored in the rules store 420 based on input received from the rules administrator device. The rules administrator may change the relevancy score of a rule in the rules store 420 store by providing a new value for the relevancy score to the rules administration module 460.

Flowcharts

Figure 5:
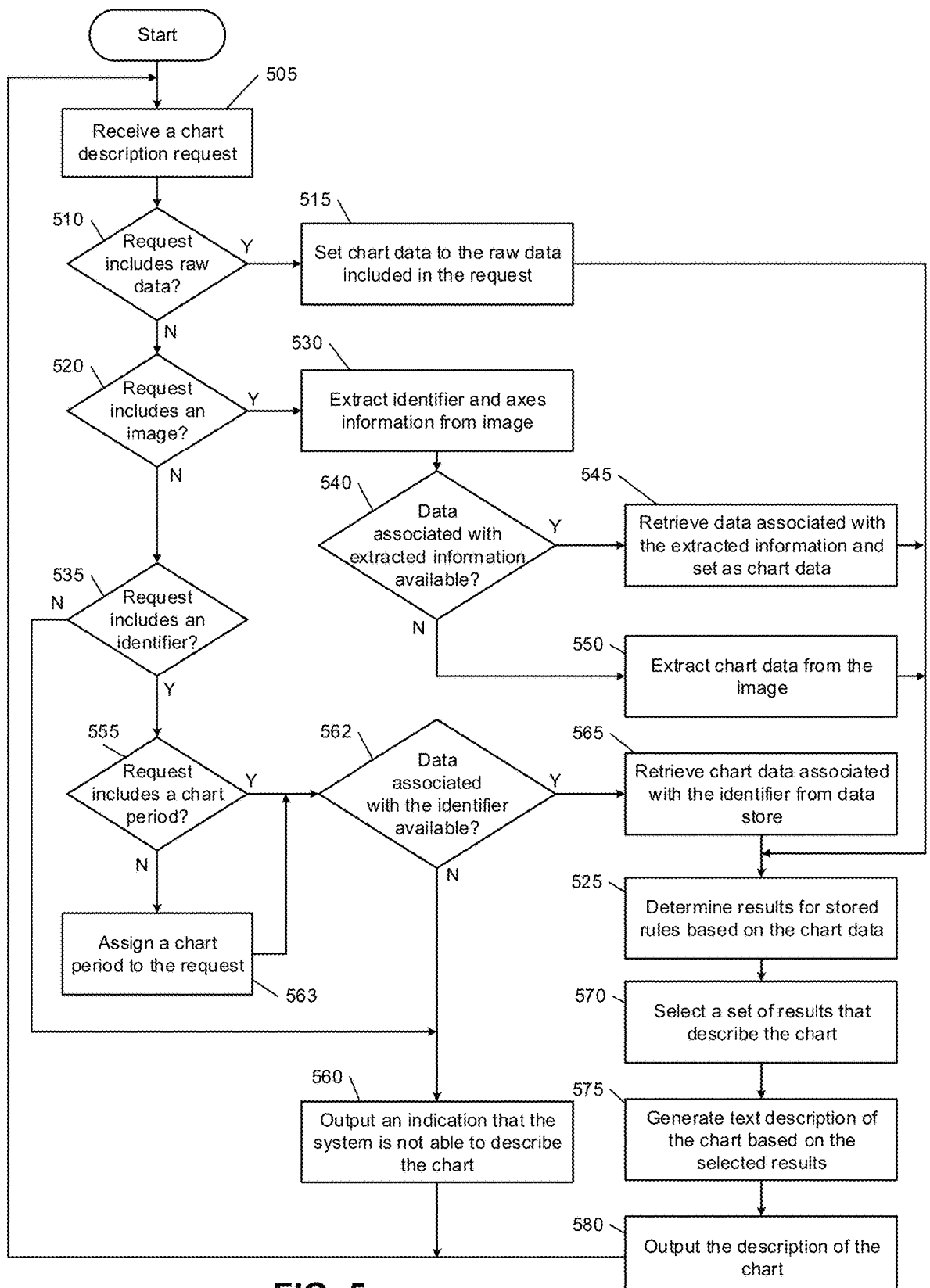
FIG. 5 is a flowchart showing the generation of a chart description by an implementation of the chart description system.

In FIG. 5, example control of a chart description system, such as the chart description system 140, begins at 505. At 505, control receives a chart description request. For example, the chart description system 140 may receive either the raw data chart description request 310, the identifier and period chart description request 320, or the image chart description request 330. At 510, control determines whether the request includes raw data. If so, control continues with 515; otherwise, control transfers to 520. At 515, control sets chart data to the raw data included in the request. Control then progresses to 525.

Returning to 520, control determines whether the request includes an image of a chart. If so, control progresses to 530; otherwise, control transfers to 535. At 530, control extracts identifier and axis information from the image. For example, control may perform OCR on the image to locate an identifier associated with the chart in the image and the values of the axes of the chart. Control then progress to 540.

At 540, control determines whether historical data associated with the extracted identifier and axis information is available. If so, control continues to 545; otherwise control transfers to 550. At 545, control retrieves the historical data associated with the image of the chart and sets the chart data to the retrieved historical data. Control then progresses to 525.

At 550, control extracts historical data from the image of the chart and sets the chart data to the extracted historical data. For example, control may perform OCR and/or other image analysis techniques on the image of the chart to generate the historical data. Control then progresses to 525.

Returning to 535, control determines whether the request includes an identifier. If so, control continues with 555; otherwise, control transfers to 560. At 555, control determines whether the request includes a chart period. If so, control continues with 562; otherwise, control transfers to 563.

At 563, control assigns a chart period to the chart description request. For example, control may assign a predetermined period as the chart period for the request. In some implementations, the predetermined period may be one month. In other implementations, the predetermined period may be 52 weeks. In yet other implementations, the predetermined period may be another length of time. Control then progresses to 562.

At 562, control determines whether historical data associated with the identifier included in the chart description request is available. If so, control progresses to 565; otherwise, control transfers to 560. In various implementations, the chart description request may permit inclusion of an identifier along with an image. In such implementations, the decision 520 of whether the request includes an image may be relocated to after control determines at 562 that data associated with the identifier is not available. If the request includes an image, control transfers to 530 to extract data from the image. Otherwise, control continues to 560 to indicate that data is not available for purposes of describing the image. When the decision 520 is relocated, control may transfer to 520 from 535 in response to control determining that the request does not include an identifier.

At 565, control retrieves the historical data associated with the identifier included in the chart description request and sets the chart data to the retrieved historical data. For example, control may retrieve historical data associated with the identifier for the chart period. In some implementations, if historical data that spans the entire chart period is not available, control may retrieve all available historical data associated with the identifier that falls within the chart period. In other implementations, control may retrieve all available historical data associated with the identifier. Control then progresses to 525.

In various implementations, following 515, the raw data may be supplemented. For example, if the request includes an identifier and data associated with the identifier is available, the raw data may be supplemented by chart data associated with the identifier from the data store, as shown in 565. Control then continues at 525.

At 560, control outputs an indication that the chart description system is not able to describe the chart associated with the chart description request. For example, control may output an error message indicating that the chart description request cannot be fulfilled. In some implementations, the error message may include the reason that the request cannot be fulfilled—for example, historical data associated with the request is not available. The error message may include human-interpretable text for reproducing visually or audibly to explain the error. Control then returns to 505.

At 525, control applies a set of stored rules to the chart data and determines the result (true or false) of each of the applied rules. For example, control may apply a set of rules that is associated with the security type of the identifier associated with the chart description request. Control then progress to 570.

At 570, control selects a subset of rules among the applied rules to describe the chart. Control selects a determined number of rules with the highest relevancy scores from the applied rules that resulted in a true outcome. The number of selected rules may be based on a predetermined number of rules or a preferred number of rules included in the chart description request. Control then progresses to 575.

At 575, control generates a text description of the chart. Control uses text scripts associated with each of the selected rules to generate the text description. Control may use information from the chart description request—such as the identifier—and the chart data to determine values for variables included in the text scripts.

At 580, control outputs a description associated with the chart description request. For example, control may output the generated text description of the chart. In some implementations, control outputs the text description as soon as it is generated. In other implementations, control may base the output on priority information included in the chart description request. For example, if the request indicates that the description should be emailed at a specific time, control will email the text description to the email address included in the priority information at the specified time. In other implementations, in response to determining that none of the rules applied to the chart data resulted in a true outcome, the description may include a statement that none of the stored rules applied to the chart description request. Control then returns to 505.

Figure 6:
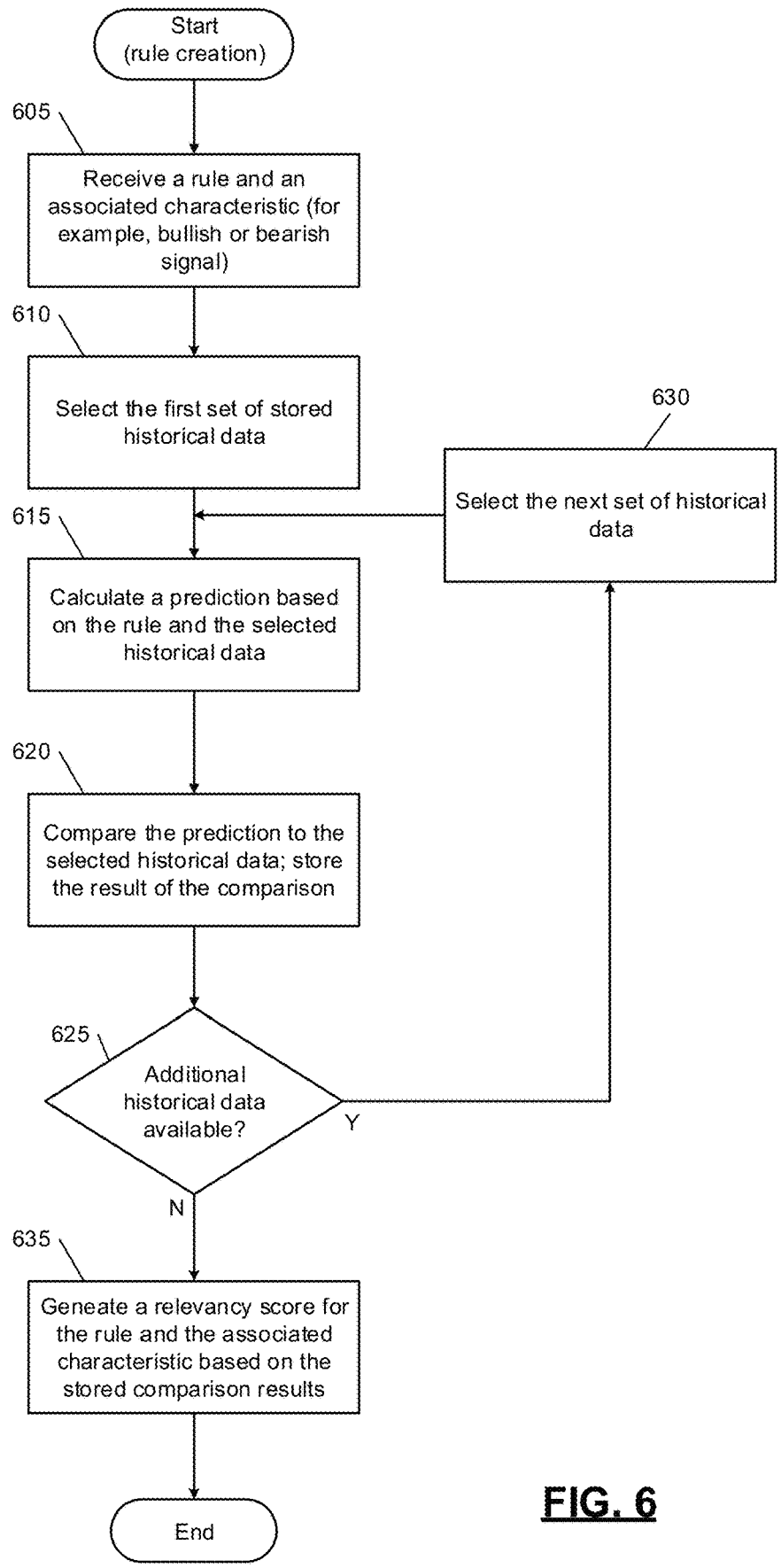
FIG. 6 is a flowchart of example creation of a rule with learned relevancy.

In FIG. 6, example creation of a rule with learned relevancy score begins at 605. At 605, control receives a rule and an associated characteristic—such as a bullish or bearish signal. For example, control may receive the rule and characteristic from a user via the rules administrator device 455. At 610, control selects a first set of historical data to which the rule will be applied. In various implementations, control may select a set of historical data that is currently stored in the data cache 430. In other implementations, control may obtain historical data from the external data sources and use the newly obtained data as the selected set of historical data. Control then continues at 615.

At 615, control calculates a prediction by applying the rule to the selected historical data. For example, control may apply the rule to the selected historical data and determine whether the result of the rule is true. In response to the result of the rule being true, control predicts that the associated characteristic applies to the selected historical data. At 620, control compares the prediction to the selected historical data. For example, control analyzes the selected historical data and determines whether the data indicates a bullish or bearish trend. Control then compares the prediction to the determined trend and stores the result of the comparison. The stored comparison includes both the absolute result of the comparison and the magnitude of the comparison. In other words, whether the prediction matched the determined trend and how closely the prediction matched the determined trend. Control then continues to 625.

At 625, control determines if additional historical data is available. For example, control may determine whether the data cache 430 currently includes additional historical data or whether the external data sources contain additional historical data. If so, control continues with 630, where control selects the additional historical data as the set of historical data to apply the rule to. Control then returns to 615. If, at 625, control determines that additional historical data is not available, control transfers to 635.

At 635, control generates a relevancy score for the rule based on the stored comparisons. For example, control may calculate the relevancy score of the rule by subtracting the combined frequency and magnitude of incorrect predictions from the combined frequency and magnitude of correct predictions. Accordingly, as the frequency of correct predictions and/or the magnitude of each correct prediction increases, the generated relevancy score increases. Conversely, as the frequency of incorrect predictions and/or the magnitude of each incorrect prediction increases, the generated relevancy score decreases. Control stores the rule, associated characteristic, and generated relevancy score as a new rule. For example, control stores the new rule in the rules store 420. Control then ends.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLU- ETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A chart description system comprising:
  a request processing circuit configured to receive a chart description request, wherein the chart description request is associated with an asset;
  a storage circuit configured to store a plurality of rules, wherein each rule of the plurality of rules is associated with a respective relevancy score;
  a rules application circuit configured to, in response to receiving the chart description request:
    retrieve chart data from a chart associated with the chart description request;
    determine a set of rules from the plurality of rules stored in the storage circuit; and
    determine a set of results by applying each rule in the set of rules to the chart data corresponding to the asset, such that the set of results corresponds to the set of rules;
  a rules selector circuit configured to select a subset of results from the set of results by:
    removing ones of the set of results that do not satisfy a criterion;
    from the set of rules, identifying a first subset of rules that respectively correspond to remaining ones of the set of results;
    from the first subset of rules, selecting a second subset of rules having the highest associated relevancy scores; and
    from the set of results, identifying results corresponding to the second subset of rules and setting the identified results as the subset of results;

a text generation circuit configured to:
obtain narrative text based on the subset of results; and
generate a text description of the chart including the subset of results and corresponding narrative text, wherein the text description describes the chart associated with the chart description request; and
an output circuit configured to transmit the text description to a source of the chart description request.

2. The chart description system of claim 1 further comprising:
a data cache configured to store a plurality of historical data sets; and
a data acquisition circuit configured to:
receive an identifier of the asset from the request processing circuit;
determine whether the data cache includes historical data associated with the identifier; and
in response to determining that the data cache does not include the historical data associated with the identifier, (i) retrieve the historical data associated with the identifier from a data source and (ii) store the historical data associated with the identifier in the data cache,
wherein the chart data includes the historical data associated with the identifier.

3. The chart description system of claim 2 wherein the data acquisition circuit is configured to:
determine a set of frequently requested identifiers; and
for each identifier of the set of frequently requested identifiers, (i) periodically retrieve updated historical data associated with the identifier from the data source and (ii) store the updated historical data in the data cache.

4. The chart description system of claim 1 further comprising an image analysis circuit configured to, in response to the chart description request including an image of a chart:
determine an identifier of the asset by performing optical character recognition on the image, and
provide the identifier to the request processing circuit.

5. The chart description system of claim 4 wherein the request processing circuit is configured to:
determine whether historical data associated with the identifier is available;
in response to determining that the historical data associated with the identifier is available, instruct the rules application circuit to obtain the historical data for use as the chart data; and
in response to determining that the historical data associated with the identifier is not available, instruct the image analysis circuit to extract the chart data from the image.

6. The chart description system of claim 1 further comprising a rules administration circuit configured to:
add a new rule to the plurality of rules stored in the storage circuit; and
update a relevancy score of a first rule of the plurality of rules.

7. The chart description system of claim 6 wherein the rules administration circuit is configured to:
obtain a first set of historical data;
generate a prediction associated with the first set of historical data based on the new rule and a characteristic associated with the new rule;
identify a trend in the first set of historical data;
compare the prediction to the identified trend; and
determine a relevancy score of the new rule based on the comparison.

8. The chart description system of claim 1 wherein:
the chart description request includes raw data,
the request processing circuit is configured to provide the raw data to the rules application circuit, and
the chart data associated with the chart description request is the raw data.

9. The chart description system of claim 1 wherein:
the chart description request includes priority information, and
the output circuit is configured to transmit the text description based on the priority information.

10. The chart description system of claim 1 wherein each rule of the plurality of rules includes corresponding narrative text.

11. The chart description system of claim 1 wherein the criterion is association with a true outcome.

12. A method comprising:
receiving a chart description request, wherein the chart description request is associated with an asset; and
in response to receiving the chart description request:
retrieving chart data from a chart associated with the chart description request;
determining a set of rules from a plurality of rules stored in a storage circuit, wherein each rule of the plurality of rules is associated with a respective relevancy score;
determining a set of results by applying each rule in the set of rules to the chart data associated with the asset, such that the set of results corresponds to the set of rules;
removing ones of the set of results that do not satisfy a criterion, wherein the criterion is associated with a true outcome;
identifying a first subset of rules from the set of rules that respectively correspond to remaining ones of the set of results;
selecting a second subset of rules from the first subset of rules, wherein the second subset of rules comprise rules having the highest associated relevancy scores;
identifying results from the set of results which correspond to the second subset of rules;
setting the identified results as a subset of results;
obtaining narrative text based on the subset of results;
generating a text description of the chart including the subset of results and corresponding narrative text, wherein the text description describes a chart associated with the chart description request; and
transmitting the text description to a source of the chart description request.

13. The method of claim 12 comprising:
storing a plurality of historical data sets in a data cache;
determining an identifier associated with the chart description request;
determining whether the data cache includes historical data associated with the identifier;
in response to determining that the data cache does not include the historical data associated with the identifier, (i) retrieving the historical data associated with the identifier from a data source and (ii) storing the historical data associated with the identifier in the data cache; and
retrieving the historical data associated with the identifier from the data cache,
wherein the chart data includes the historical data associated with the identifier.

14. The method of claim 13 further comprising:
  determining a set of frequently requested identifiers; and
  for each identifier of the set of frequently requested identifiers, (i) periodically retrieving updated historical data associated with the identifier from the data source and (ii) storing the updated historical data in the data cache.

15. The method of claim 12 further comprising, in response to the chart description request including an image of a chart, determining an identifier by performing optical character recognition on the image and obtaining the chart data based on the identifier.

16. A method comprising:
  receiving a chart description request, wherein the chart description request is associated with an asset;
  in response to the chart description request including an image of a chart, determining an identifier by performing optical character recognition on the image and obtaining chart data based on the identifier;
  determining whether historical data associated with the identifier is available;
  in response to determining that the historical data associated with the identifier is available, retrieving the historical data associated with the identifier;
  in response to determining that the historical data associated with the identifier is not available, extracting the historical data associated with the identifier from the image; and
  in response to receiving the chart description request:
    determining a set of rules from a plurality of rules stored in a storage circuit, wherein each rule of the plurality of rules is associated with a respective relevancy score;
    determining a set of results by applying each rule in the set of rules to the chart data and the historical data associated with the identifier;
    selecting a subset of results from the set of results, wherein the selection of the subset of results is based on the relevancy scores of the rules associated with the set of results;
    generating a text description based on the subset of results, wherein the text description describes a chart associated with the chart description request; and
    transmitting the text description to a source of the chart description request.

17. The method of claim 12 further comprising:
  adding a new rule to the plurality of rules stored in the storage circuit; and
  updating a relevancy score of a first rule of the plurality of rules.

18. The method of claim 17 further comprising:
  obtaining a first set of historical data;
  generating a prediction associated with the first set of historical data based on the new rule and a characteristic associated with the new rule;
  identifying a trend in the first set of historical data;
  comparing the prediction to the identified trend; and
  determining a relevancy score of the new rule based on the comparison.

19. The method of claim 12 wherein, in response to the chart description request including raw data, using the raw data as the chart data.

20. The method of claim 12 wherein:
  the chart description request includes priority information; and
  transmitting the text description includes selectively delaying transmission of the text description based on the priority information.

21. The method of claim 12 wherein each rule of the plurality of rules includes a corresponding narrative text.

\* \* \* \* \*